US006939155B2

United States Patent
Postrel

(10) Patent No.: US 6,939,155 B2
(45) Date of Patent: Sep. 6, 2005

(54) MODULAR ELECTRONIC SYSTEMS FOR VEHICLES

(76) Inventor: Richard Postrel, 5244 North Bay Rd., Miami Beach, FL (US) 33140

(*) Notice: Subject to any disclaimer, the term of this patent is extended or adjusted under 35 U.S.C. 154(b) by 0 days.

(21) Appl. No.: 10/328,943

(22) Filed: Dec. 24, 2002

(65) Prior Publication Data

US 2004/0121645 A1 Jun. 24, 2004

(51) Int. Cl.$^7$ .............................................. H01R 13/62
(52) U.S. Cl. ....................................... 439/297; 439/374
(58) Field of Search ................................ 439/297, 374, 439/34, 638, 668, 928.1; 320/104; 307/10.1

(56) References Cited

U.S. PATENT DOCUMENTS

| | | | | |
|---|---|---|---|---|
| 4,248,494 A | * | 2/1981 | McDonald et al. | 439/638 |
| 4,881,910 A | * | 11/1989 | Odemer | 439/476.1 |
| 4,945,335 A | * | 7/1990 | Kimura et al. | 439/297 |
| 4,953,772 A | | 9/1990 | Phifer | |
| 5,002,074 A | * | 3/1991 | Kimisawa | 131/231 |
| 5,154,617 A | | 10/1992 | Suman et al. | |
| 5,202,913 A | * | 4/1993 | Lang et al. | 455/575.9 |
| 5,645,340 A | | 7/1997 | Colton | |
| 5,808,373 A | | 9/1998 | Hamanishi et al. | |
| 5,823,815 A | * | 10/1998 | Takata | 439/374 |
| 5,993,262 A | * | 11/1999 | Kowdynski et al. | 439/638 |
| 6,042,414 A | | 3/2000 | Kunert | |
| 6,216,955 B1 | * | 4/2001 | Le Roux et al. | 235/492 |
| 6,551,142 B2 | * | 4/2003 | Eisenbraun | 439/668 |
| 6,633,482 B2 | * | 10/2003 | Rode | 439/945 |

* cited by examiner

*Primary Examiner*—Tho D. Ta
(74) *Attorney, Agent, or Firm*—Anthony R. Barkume, P.C.

(57) ABSTRACT

Modular electronic system for vehicle dashboards, interior roofs, and center consoles that includes a sleeve or frame adapted to engage with the vehicle and integrate with a housing adapted to be mated with the sleeve or frame. The sleeve or frame has an inner surface area, a first pair of power contacts arranged so as to be exposed on the inner surface area, and a power connector adapted to plug into a power supply receptacle located on the vehicle dashboard (such as a cigarette lighter receptacle). Wiring means is used for connecting the power connector to the first pair of power contacts. As a result, when the power connector is plugged into a power supply receptacle on the vehicle dashboard, electrical power from the vehicle is supplied to the pair of power contacts and electronics (such as a cell phone, audio/video entertainment device, computer, radar detector, etc.) within the housing are provided with power from the vehicle. This modular system allows a vehicle owner to install one such frame or sleeve and easily interchange housings to provide the functionality desired.

35 Claims, 9 Drawing Sheets

MODULAR ELECTRONIC SYSTEMS FOR VEHICLES

BACKGROUND OF THE INVENTION

The present invention relates to the use of electronic devices in vehicles such as automobiles; and in particular to a modular system that may be included as original factory equipment, dealer-installed, or owner-retrofitted, which takes advantage of otherwise unused or reconfigured space in a vehicle dashboard, roof or console for mounting such electronic equipment.

SUMMARY OF THE INVENTION

Vehicles such as automobiles, mini-vans, sport utility vehicles, small and large trucks, and the like, are used more and more by families and individuals in their everyday life. Many persons use their vehicles for extensive periods of travel, whether for business or pleasure. As a result, many persons spend large amounts of time in their vehicles in accomplishing their tasks.

Electrical and electronic devices are in abundance, with new types of devices becoming available every day due to advances in electronic, entertainment, communications and computer technologies. As a result, many types of devices are being made available for portable use; for example handheld music players such as MP3 players, cell phones, DVD players, laptop computers, etc. There is a naturally increasing demand for the implementation of such devices in the vehicles mentioned above, due largely to the amount of vehicular travel being presently done. For example, a business person that travels as part of his or her occupation often requires the use of a portable computer, a cell phone, a GPS receiver, a personal digital assistant (PDA), a beverage warming device, a beverage cooling device, a radar detector, etc. Families that travel would also require similar devices in their vehicles, and also would benefit greatly from entertainment systems such as television sets, DVD players, MP3 players, etc. The demand for these devices increases daily.

Even if a person were to collect an array of such devices, there would be a hodgepodge of batteries, chargers, etc., and unmanageable clutter in using them, likely to the point of simply not bothering to include them on a trip. In addition, there is an inherent danger in having one or more such devices sitting on the floor or a seat of the vehicle, since the device would become a dangerous projectile in the event of an accident. Although some of these types of devices may be included with a vehicle as part of the factory-installed options (e.g. a GPS receiver), many such devices simply cannot be easily added as an option, or are not desired by the vehicle owner until well after the purchase is made and it is too late to have the device factory installed. Moreover, there is usually not much room to include more than one such device, especially in small vehicles or those that have crowded dashboards.

It is therefore desired to be able to provide a system for use in a vehicle that overcomes these problems of the prior art. It is desired to provide such a system that allows a vehicle owner (or user) to interchange, at will, one or more various electronic devices for use in a safe (i.e. secured) manner so as to avoid flying projectiles. It is also desired to provide adaptability for future devices to be used, in the event new technologies are implemented or the needs of the vehicle owner change over time (e.g. having children necessitates the use of a television set in the vehicle). It is also desired to allow the vehicle owner to take advantage of otherwise unused dashboard and/or console space to accomplish these objectives.

It is particularly noted that although most vehicles are sold with cigarette ashtrays and cigarette lighters embedded within a dashboard, many if not most of these are not required by their drivers and passengers since most people do not smoke. Vehicle manufacturers continue to include these items since the elimination of them will foreclose many vehicle sales to those that require such items. For the majority of people, this is simply wasted space.

In U.S. Pat. No. 5,645,340, a flashlight is disclosed that is adapted to replace an ashtray in a dashboard of a vehicle. This flashlight is battery powered and can be slid out of the ashtray opening when needed. The batteries may be replaced when they expire, or a set of rechargeable ones may be used, wherein the batteries are charged by modifying the vehicle's electrical system. Although this flashlight takes advantage of the space otherwise unused by the ashtray in the dashboard, the space is used only for storing the flashlight when it is not used, since the flashlight only has value when it is removed from the dashboard. In addition, since different vehicles have different ashtray form factors, a manufacturer would have to produce hundreds or even thousands of different form factor flashlights to ensure that one would be available for any consumer. This would be a prohibitively expensive undertaking.

SUMMARY OF THE INVENTION

Therefore, a first major aspect of the invention is a modular system for vehicle dashboards that includes a sleeve adapted to slide into and engage with an opening in the dashboard of a vehicle and a housing adapted to be inserted into the sleeve. The sleeve has an inner surface area, a first pair of power contacts arranged so as to be exposed on the inner surface area, and a power connector adapted to plug into a power supply receptacle located on the vehicle dashboard (such as a cigarette lighter receptacle). Wiring means is used for connecting the power connector to the first pair of power contacts. As a result, when the power connector is plugged into a power supply receptacle on the vehicle dashboard, electrical power from the vehicle is supplied to the pair of power contacts.

The housing is adapted to be inserted into the sleeve and slidingly engages with the inner surface area of the sleeve. The housing includes an electrically powered device and a second pair of power contacts arranged so as to electrically connect with the first pair of power contacts in the sleeve when the housing is engaged with the sleeve, and to provide electrical power from the vehicle to the electrically powered device.

As a result of this modular system, a vehicle owner need only obtain one sleeve, which is configured to slide into the ashtray (or other type of) opening in the vehicle dashboard, and plug the power connector into the nearby cigarette lighter receptacle. The vehicle owner can insert a desired housing module, which includes the desired electrical device, such as an MP3 player, DVD player, CD player, beverage warming or cooling device, cellular telephone, etc., and the device obtains operating power from the vehicle's electrical system. The inserted housing substantially fits within the recess of the ashtray, thus providing a safe, aesthetically pleasing component desired by the vehicle owner. The vehicle owner can interchange the housings to obtain desired functions as his or her needs change (e.g. use the cellular telephone housing when traveling on business, and use an MP3 player when traveling for pleasure, etc.). This invention thus enables rapid ease of reconfiguration of electronic instruments within the vehicle. By locating the housing in the ashtray recess, the housing is made generally available to both occupants of the front since the ashtray is usually located near the center of the dashboard.

For electrical devices that have audio output, such as CD players or cell phones, the system can utilize the existing speakers of the vehicle or dedicated speakers mounted within the housing itself. When existing speakers are used, then contacts are provided in the sleeve that are wired to the vehicle's speakers. Mating contacts are provided on the housing, such that when the housing is engaged within the sleeve, the external speakers are connected to the electrical device within the housing and audio signals may be transmitted to the external speakers via the contacts. A similar set of contacts may be used for an externally mounted antenna and/or microphone.

In an alternative embodiment, the power contacts in the sleeve are connected directly to vehicle power (e.g. behind the dashboard) without having to plug a power connector into the dashboard cigarette lighter. This embodiment has the advantage of eliminating the externally mounted connector (and wire harness), but requires a modification to the vehicle wiring rather than simply plugging the connector into the cigarette lighter receptacle.

In a second major aspect of the invention, provided is a modular vehicle interior roof dome light modification system that includes a mounting adapter configured to attach to the interior roof of a vehicle, and a housing adapted to be engaged with the mounting adapter. The mounting adapter includes a power connector adapted to mate with the dome light power lead connected to the dome light mounted on the interior roof of the vehicle. The mounting adapter also has a first pair of power contacts, and wiring means for connecting the power connector to the first pair of power contacts. As a result, when the power connector is mated with the dome light power lead, electrical power from the vehicle is supplied to the first pair of power contacts.

The housing includes an electrically powered device and a second pair of power contacts arranged so as to electrically connect with the first pair of power contacts when the housing is engaged with the mounting adapter and to provide electrical power from the vehicle to the electrically powered device. The housing may include an entertainment system such as a DVD player and a screen, or a television set, etc.

In a third major aspect of the invention, provided is a modular system for vehicle consoles that includes a frame adapted to engage with a console in a vehicle and a housing adapted to be mated with the frame. The frame has a first pair of power contacts arranged so as to be exposed on the frame, and a power connector adapted to plug into a power supply receptacle located in the vehicle interior. Wiring means is used for connecting the power connector to the first pair of power contacts. As a result, when the power connector is plugged into a power supply receptacle, electrical power from the vehicle is supplied to the pair of power contacts.

The housing is adapted to be mated with the frame, and includes an electrically powered device and a second pair of power contacts arranged so as to electrically connect with the first pair of power contacts when the housing is mated with the frame and to provide electrical power from the vehicle to the electrically powered device.

The frame may also include a display device (attached, for example by an articulating arm attached to the housing with a ball and socket mechanism), and a first plurality of display contacts arranged so as to be exposed on the frame and wired to the display device. The frame may also include speaker contacts arranged so as to be exposed on the frame and wired to speakers mounted external to the housing (e.g. mounted to the frame or located within the interior of the vehicle). The electrically powered device may be an audio/visual entertainment device, such as a DVD player, a VCR deck, a gaming console, a personal computer, and/or a television set.

As a result of this modular system, a vehicle owner need only obtain one console frame, which is configured to engage with the vehicle console, and plug the power connector into the nearby cigarette lighter (or power point) receptacle. The vehicle owner can insert a desired housing module, which includes the desired electrical device, such as a DVD player, gaming machine or television set, and the device obtains operating power from the vehicle's electrical system. The inserted housing substantially fits within the recess of the console (or on top of it), thus providing a safe, aesthetically pleasing component desired by the vehicle owner. The vehicle owner can interchange the housings to obtain desired functions as his or her needs change. By locating the housing in the center console between the two front bucket seats, the housing is made generally available to both occupants of the rear. In addition, the display is easily pulled forward to enable the front seat occupant(s) to view it.

DETAILED DESCRIPTION OF THE PREFERRED EMBODIMENT

Figure 1:
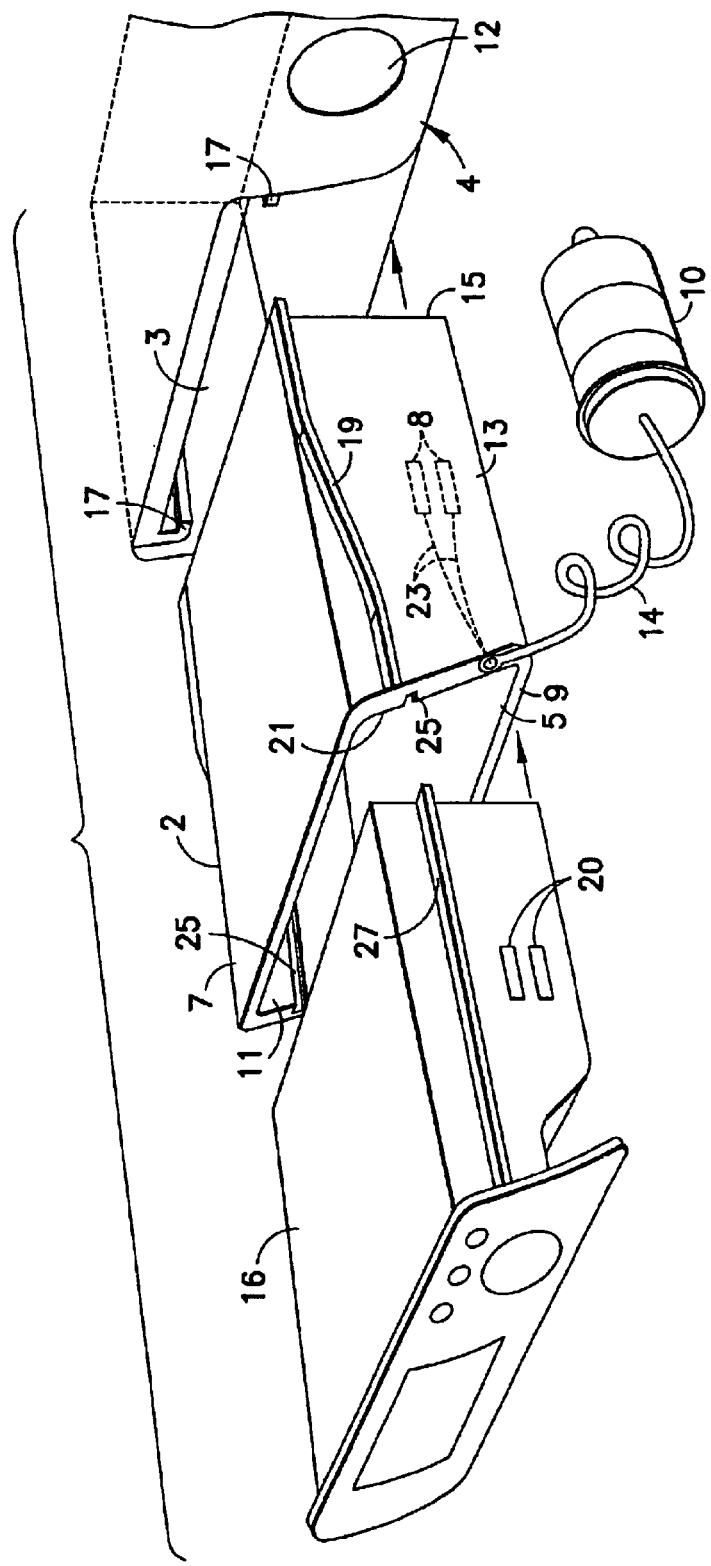
FIG. 1 is an exploded perspective illustration of a modular dashboard electronics system of the present invention.
Figure 3:
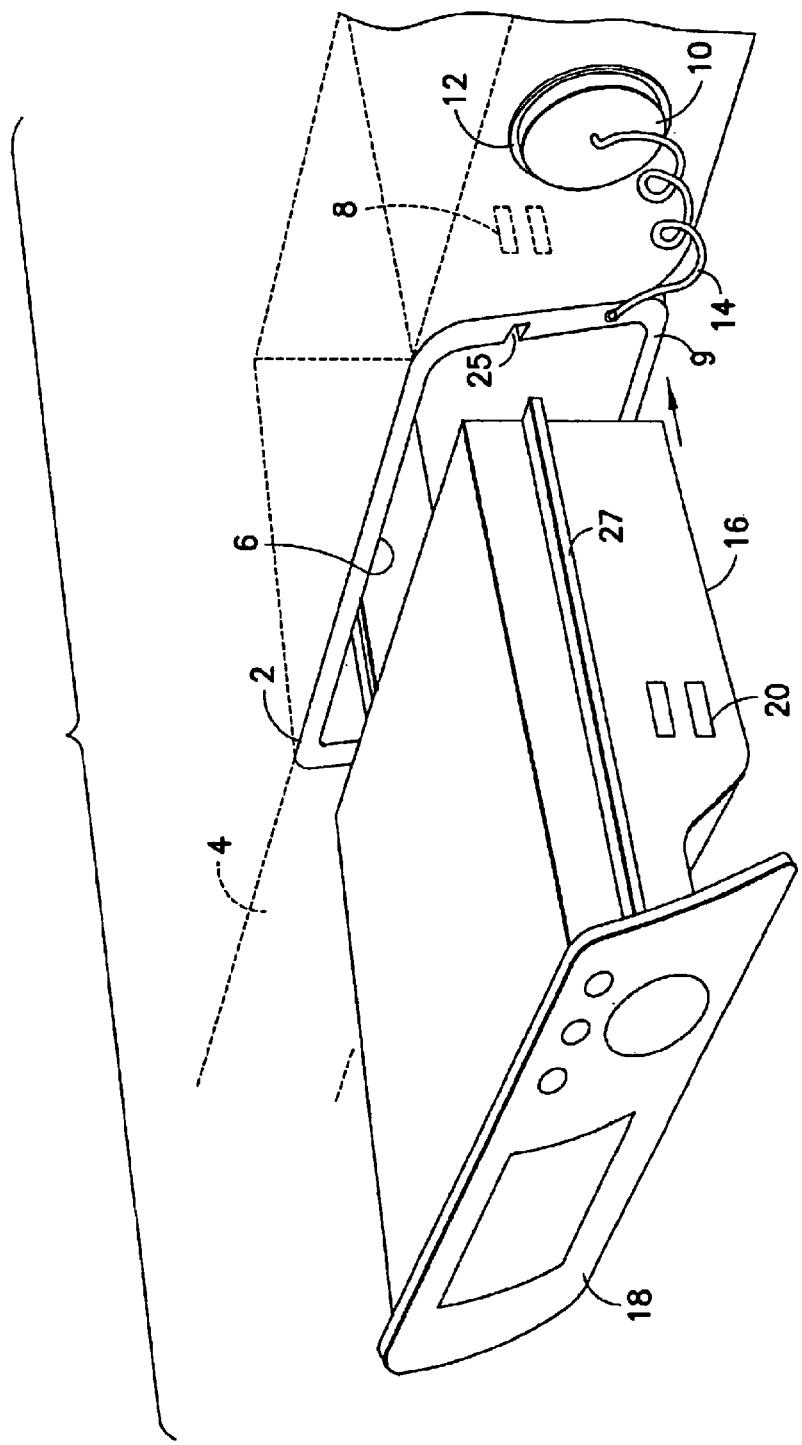
FIG. 3 is a partially assembled perspective illustration of the dashboard electronics system of FIG. 1.

The present invention relates to the use of a modular electronic system for vehicles, where a vehicle is typically a motor vehicle such as a car, van or mini-van, bus, motor home, recreational vehicle, sport utility vehicle, pickup truck, etc., and also includes boats and other water craft, aircraft, spacecraft, and any mobile environment with a self-contained power system. FIG. 1 is a perspective illustration of a modular dashboard electronics system in accordance with a first major aspect of the invention. In this aspect of the invention, two major components are utilized; a sleeve 2 adapted to slide into and engage with an opening 3 in the dashboard 4 of a vehicle such as a car, and a housing 16 adapted to be inserted into the sleeve 2. The sleeve 2 becomes a universal mounting device for inserting any of several available housings 16, each having a different electrically powered device contained within. For example, shown in FIG. 1 is an MP3 player contained within the housing 16, which is shown easily sliding into the sleeve 2. The sleeve is shown in FIG. 1 outside of the dashboard opening 3 for purpose of illustration. FIG. 3 illustrates the sleeve in place in the dashboard opening, with the housing about to be inserted into the sleeve.

For example, as previously mentioned, the ashtray receptacle commonly found in most vehicles makes an exemplary opening for the sleeve, due to its location near the center of the dashboard (thus providing proximity to both occupants of the front seat) as well as the fact that most people do not even use the ashtray supplied with the vehicle. The ashtray (not shown) is easily removed, and the sleeve 2 is inserted in its place. Other dashboard openings may also be used, such as those originally intended for cup holder trays and the like. In this invention, it is contemplated that various types of sleeves 2 will be produced in order to accommodate the various types of dashboard openings. Each of the sleeves will have an inner space 5 defined by the four walls (upper wall 7, lower wall 9, left wall 11, and right wall 13) and likely a rear wall 15. The inner space 5 will be formed to provide a universal size, so that many different housings (having many different types of electrical devices contained within) may be used with any of the sleeves. Thus, the outer regions of the sleeve may need to vary to accommodate the various shapes of dashboard openings in use, but the inner space 5 preferably will be common amongst the various sleeves so that only one standardized housing need be manufactured for each type of device desired, with each housing fitting within the sleeve accordingly. This modular system alleviates the need to manufacture many different form factor housings for each different type of dashboard opening in use. Thus, a vehicle owner would purchase a sleeve designed for his or her vehicle, and then purchase one or more standardized devices that fit into any of the sleeves.

In the typical example shown in FIG. 1, the dashboard opening has a pair of tracks 17 that are otherwise used for receiving the ashtray supplied with the vehicle. The sleeve 2 is provided with a corresponding pair of guide rails 19 that slidingly engage with the tracks 17 to allow the sleeve 2 to easily slide within the dashboard opening 3, as shown in FIGS. 1 and 3.

The sleeve 2 also has a pair of power contacts 8 mounted on an inner surface area 21 of one of the walls 7, 9, 11, 13, or 15. Shown in FIG. 1 are the power contacts 8 mounted on the inner surface area of the right wall 13, although any location on the sleeve 2 may be chosen in accordance with the particular design. These power contacts 8 are wired, preferably via embedded wires 23 (shown as dotted lines in the FIG. 1), to a wiring harness 14, which may simply be a pair of wires in a cable or the like. The wiring harness 14 is connected to a power connector 10, which is adapted to fit securely within a power supply receptacle 12 (such as a cigarette lighter or "power point" provided with most vehicles). These types of power connectors are well known in the art, and for example are found on commercially available cell phone chargers and the like. The result of this wiring configuration is that when the power connector 10 is plugged into a nearby power supply receptacle 12 as shown in FIG. 3, the vehicle power provided to the power supply receptacle 12 (typically 12 volts from the battery) is made available to the power contacts 8 located on the inner surface area of the sleeve 2. The wiring harness 14 may be made in a convenient coiled form factor, such that it remains taught and out of the way when the sleeve is inserted into the dashboard opening and the power connector is plugged into the receptacle 12.

The housing 16, as shown in FIGS. 1 and 3, is adapted to slide within the sleeve in a similar fashion. For example, the sleeve is provided with a pair of recessed tracks 25, which are adapted to receive a mated pair of guide rails 27 provided on the housing 16. Thus, the housing 16 may easily slide within the sleeve and rest within the sleeve and dashboard opening. Engagement means may be provided to temporarily lock the housing in place, as well known in the art (for example a latching mechanism). In the place of the guide rails 27 and mating tracks 25 shown herein, other means may be provided to allow easy insertion of the housing 16 within the sleeve 2 (such as ball bearings, etc.). Alternatively, the sleeve and housing may be designed with no such rails and track, with the housing simply sliding on the lower wall 9 of the sleeve.

Figure 2:
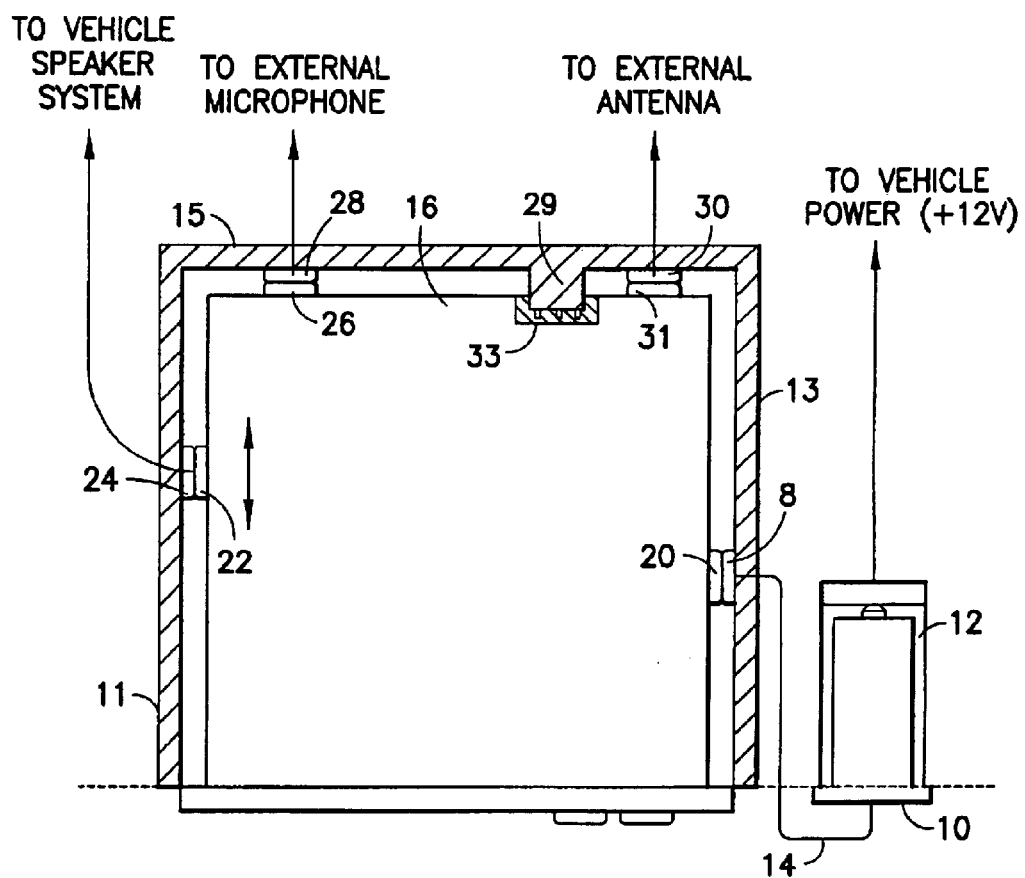
FIG. 2 is a top cross-sectional view of the modular dashboard electronics system of FIG. 1 when fully assembled.

A second pair of electrical power contacts 20 are provided on the exterior of the housing 16, such that they make contact with the first pair of power contacts 8 when the housing is substantially inserted within the sleeve. Placement of the contacts is not critical, as long as they mate with each other to provide electrical power to the device within the housing as further described below. In the alternative to mating contacts, a connector 29 may be used on the rear wall 15 of the sleeve, as shown in FIG. 2. In this case, a mating connector 33 must be provided on the housing to allow connectivity when the housing is inserted into the sleeve. The use of a connector allows other signals to be exchanged between the sleeve and the housing, such as audio signals, antenna signals, and microphone signals, as explained further below. The use of a connector or open contacts is a design choice and the present invention would work equally well with either embodiment.

As a result of the configuration described above, electrical power from the vehicle is provided to the power contacts 20 (and thus to the electrical device within the housing 16) without need of modification to the vehicle's electrical system, by simply inserting the sleeve into the dashboard opening and plugging the power connector into the nearby receptacle.

Figure 6:
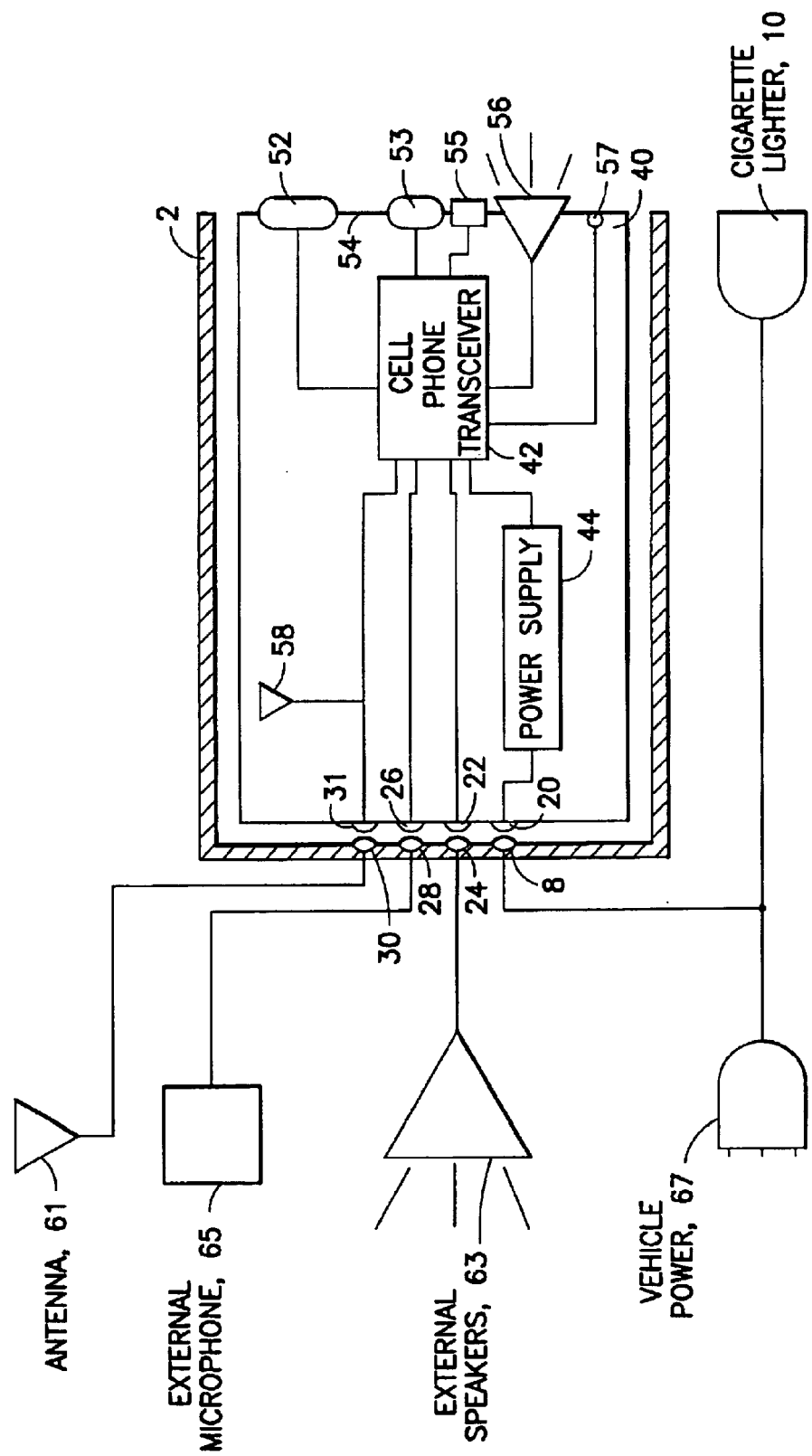
FIG. 6 is a block diagram of a cellular telephone device embedded with the housing of the modular dashboard electronics system of FIG. 1.

The vehicle owner or user may now advantageously insert a housing that contains his or her desired device, and the device will be automatically powered. In a first embodiment, a dedicated cellular telephone device is contained within the housing as shown in FIG. 6. Cellular telephone devices are well known in the art and are described only generally here as having a cell phone transceiver 42, a keypad input module 52, a display device 55, antenna means 58, audio input means 53 (such as a microphone), and audio output means 56 (such as a speaker). When the audio input means is an onboard microphone and the audio output means is an onboard speaker, hands free conversation is provided in a safe and convenient manner (and also as required by law in some jurisdictions). A headset input jack 57 may be provided on the front panel to allow private hands free conversation if required. The power supply means 44 obtains power directly from the vehicle power system via the contacts 8 and 20 and previously described. Thus, a fully self-contained cellular telephone device is used under the present invention by simply inserting it into the sleeve 2.

In the alternative to using an embedded speaker 56, microphone 53, and antenna 58, external devices may be used with this invention. For example, an external antenna 61 may be installed on the vehicle, and the antenna lead wired to an antenna contact 30 as shown in FIG. 6. A mating antenna connector 31 on the housing would provide connectivity with the cell phone transceiver when the housing is inserted into the sleeve in the same manner as power is provided to the housing. Likewise, the vehicle's speaker system 63 (or a dedicated external phone speaker) may be wired via speaker contacts 24 on the sleeve 2 and speaker contacts 22 on the housing, and an external microphone 65 may be installed and wired to the cellular phone via microphone contacts 28 on the sleeve and mating microphone contacts 26 on the housing. This embodiment is advantageous in that it allows use of external vehicle devices (e.g. speakers), but does require additional wiring to the vehicle's components.

In another alternative embodiment, power may also be supplied directly to the housing by eliminating the use of a power connector 10 and wiring the power contacts 8 directly to the vehicle's power system 67, which eliminates the need for the external connector 10 but adds a wiring step in using the modular system of the present invention.

Figure 5:
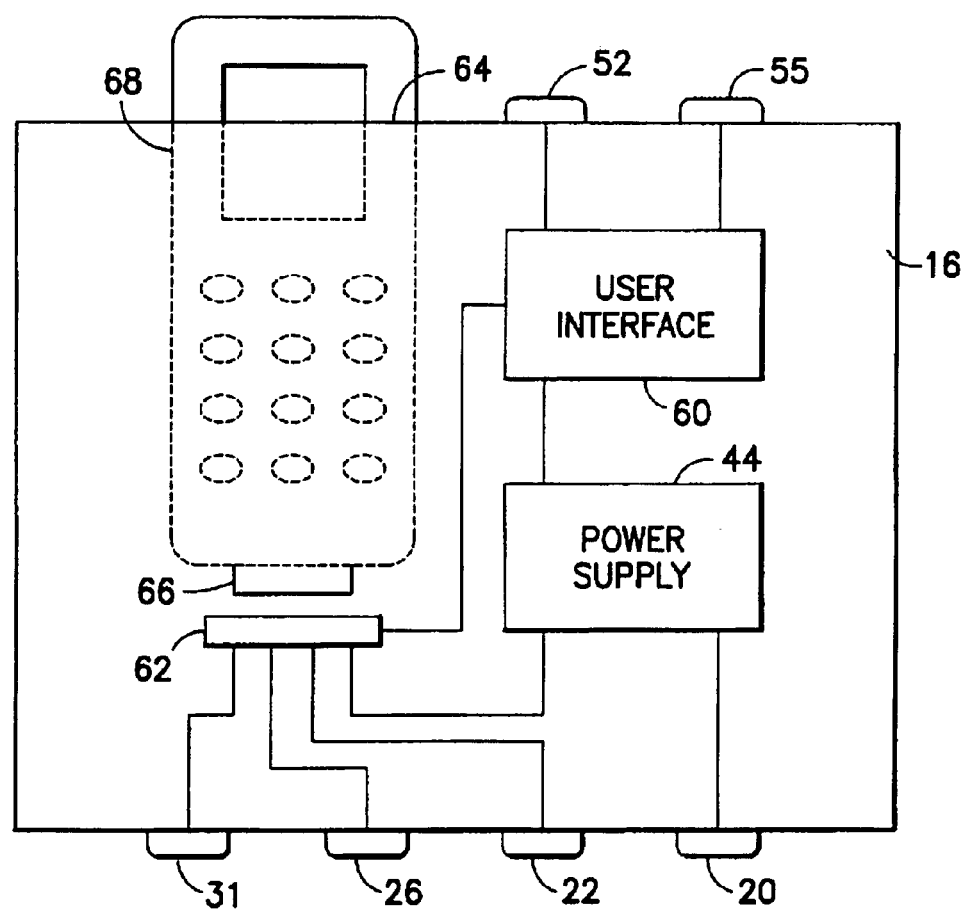
FIG. 5 illustrates the use of a cellular telephone docking station in the modular dashboard electronics system of FIG. 1.

A second cellular telephone embodiment allows the use of an existing handheld cell phone by providing a docking station within the housing as shown in FIG. 5. There, a handheld cell phone 68 is shown inserted into an opening or reception means 64, with the portion of the phone inside the housing shown in dotted lines. A docking station connector 62 is provided so as to mate with a cell phone connector 66, which is commonly found on most cell phones in use today. These connectors provide voice input and output signals, antenna signals, power signals, etc. so that external cradles, such as this docking station, may be used with the phone, and are thus well known in the art. A user interface circuit 60 is used to interface the front panel keys 52 and display 55 for controlling the operation of the cell phone 68 when docked in the housing. Likewise, the external speaker contacts 22, microphone contacts 26, antenna contact 31, and power contacts 20 are connected as shown in the Figure to enable use with the handheld phone.

Figure 4:
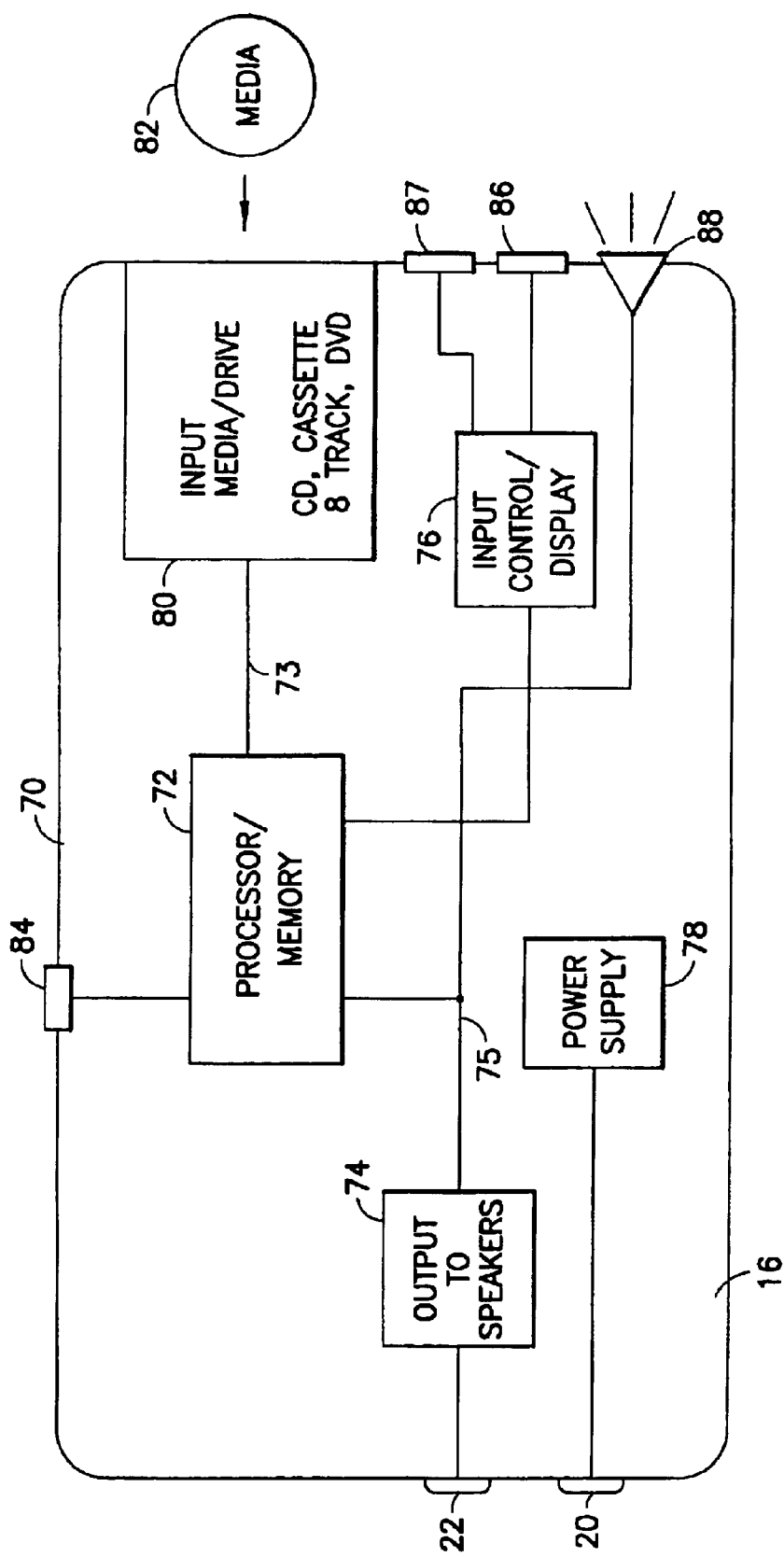
FIG. 4 is a block diagram of an electronic device embedded within a housing used in the modular dashboard electronics system of FIG. 1.

In another embodiment of the invention, the housing may contain an entertainment device 70 such as an MP3 player, a CD player, a satellite radio, and AM.FM radio, a cassette player, an 8-track tape player, etc. The basic entertainment device design is shown in FIG. 4. The entertainment device 70 includes processing and memory means 72 for processing an input signal 73 and providing an audio signal 75. The entertainment device also includes a media drive 80 or other type of data input/storage device for providing the input signals 73 to the processing means 72. For example, the media drive 80 may be a CD drive, or a cassette drive, or an 8-track tape drive, all of which will play their respective media 82 and provide input signals 73 (e.g. audio data) to the processing means 72 as well known in the art. The media drive 80 may also be a hard drive or flash memory reader such as a memory stick reader or the like, so that encoded audio material (such as MP3 songs or WMP songs, etc.) may be read by the processor 72 as well known in the art. The housing also has input control and display means 76, and input switches and controls 86, for allowing a user to control operation of the device. A display 87 is provided on the front of the housing. A power supply 78 obtains power for the device from the vehicle's power system as previously described. Audio signals 75 generated by the processing means 72 are output by output means 74 to external speakers (as previously described), or an internal speaker 88 may be provided in the housing to eliminate the need to wire the sleeve to the vehicle's speakers as previously described. A data connector 84 may be provided, such as a Firewire or USB connector, to enable file downloading into the device from a personal computer (when the housing is disengaged from the sleeve) as well known in the art.

Figure 7:
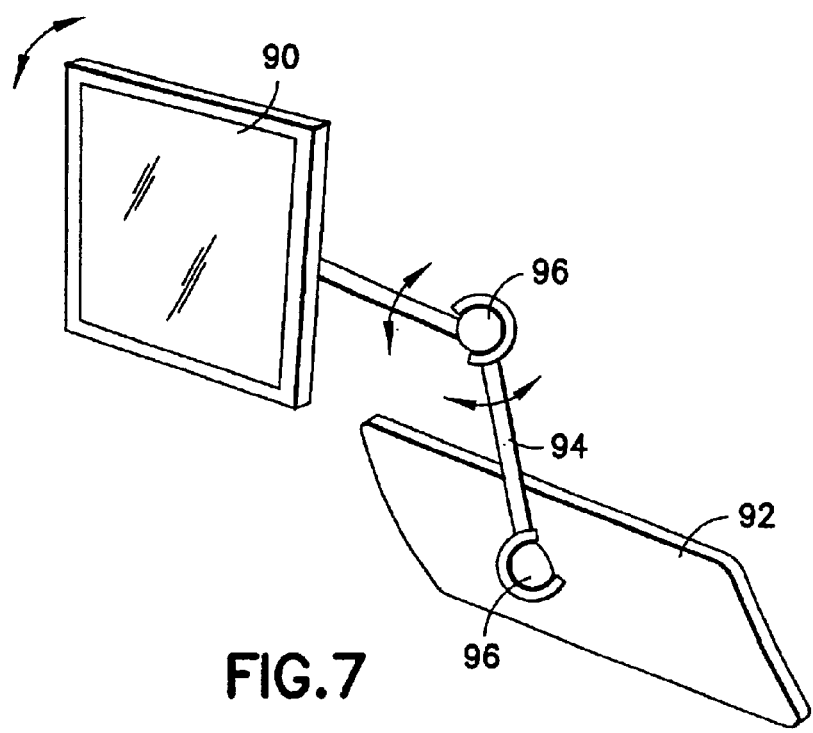
FIG. 7 illustrates an articulating display used with the housing of the modular dashboard electronics system of FIG. 1.

In addition to the audio entertainment devices described above, devices utilizing visual display are also encompassed by this invention. Thus, DVD players, VCRs, television sets, global positioning systems (GPS), video cameras, etc., may be contained within the housing within the scope of this invention. With reference to FIG. 7, for these types of audio/visual devices, a display device 90 is provided on the front panel 92 of the housing. The display panel may be an LCD panel well known in the art or other type of suitable display device such as a touchscreen panel. The display 90 may be mounted so as to be substantially encased within the housing, or it may be mounted as shown in FIG. 7 on an articulating arm 94 (for example with a ball and socket mechanism 96). In this manner, the display 90 may be adjusted to face the front seat passenger, or it may be adjusted to face the driver's seat (in particular when the vehicle is at rest, for safety reasons), or it may be raised and tilted to face the rear seat passengers as desired.

Other devices implementing a display may include a personal digital assistant (PDA), a radar detector, a computer, a gaming machine such as a MICROSOFT XBOX device, etc. Optional accessories to be integrated with the housing would include gaming controllers, a keypad, a pointing device such as a mouse, etc. Virtually any type of electrically powered device may be used within the spirit and scope of this invention. Further examples of such devices include a document scanner, a facsimile machine, a beverage warming device, a beverage cooling device, a microwave cooking unit, a video camera unit, etc.

A particularly useful device for inclusion in a housing is an auxiliary battery. A 12 volt battery, suitable for jump starting a car, may be included so that the housing may be inserted into the sleeve in the event that a vehicle has a dead battery and needs a jump start. Rather than requiring another vehicle and jumper cable, the auxiliary battery device would supply power to the vehicle, via the cigarette lighter, rather than drawing power from the vehicle. This enables a vehicle user to jump start the car from within the safety and comfort of the car.

Another useful device is a voltage converter that converts 12 VDC to 110 VAC power, with a standard outlet suitable for plugging in any type of electrical device otherwise used in a home or business. Even further useful equipment would be vehicle instrumentation such as measurement devices and the like, such as found in boats, spacecraft, etc.

In the embodiments described above, the electrically powered device is contained within the housing, which is configured to slide into the sleeve and be contained substantially within the sleeve. In an alternative embodiment, the housing may configured to partly reside outside of the confines of the sleeve. Thus, a first part of a housing may slide into the sleeve, and a second part may be mechanically and electrically connected to the first part but be adjustable in its positioning with respect to the user. For example, a computer device may be embedded within the housing, with a keyboard/mouse and display combination extending therefrom, so as to be placed in front of the passenger (or driver) as desired. The use of an articulating arm, extending from the first part of the housing as shown in FIG. 7, will accomplish this design objective.

The housing may contain a locking mechanism used in conjunction with the sleeve so that the housing may be locked into place by the user and left unattended. Likewise, the sleeve may implement a locking mechanism in conjunction with the dashboard so that the entire system is secured to the vehicle and the chance of theft can be substantially reduced or eliminated. Optionally, in this embodiment, the housing may contain a lockable compartment and act as a mini-safe for storing valuables such as jewelry.

Figure 8:
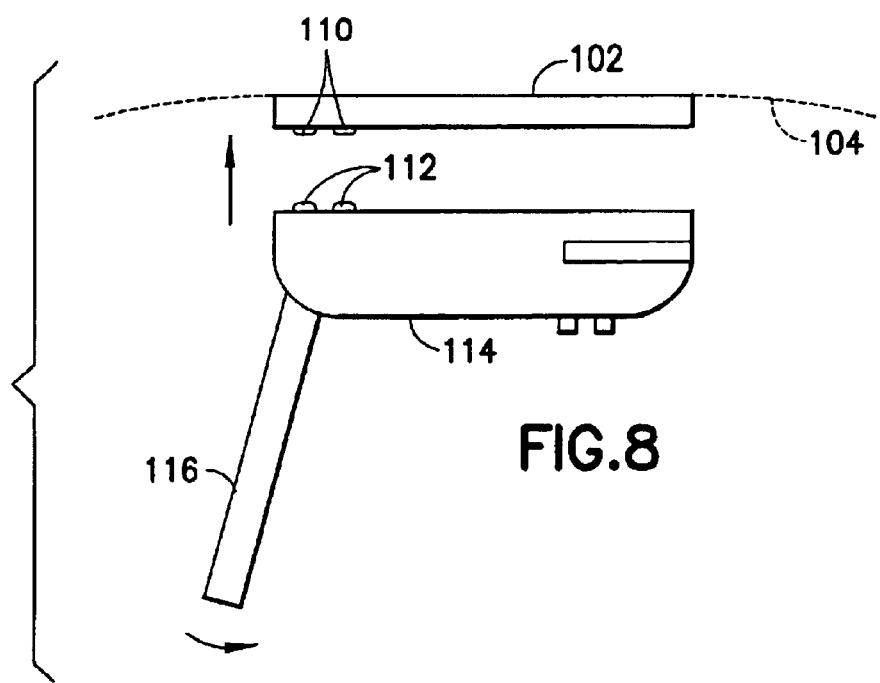
FIG. 8 is a side view of a dome light modification system in accordance with the present invention.
Figure 9:
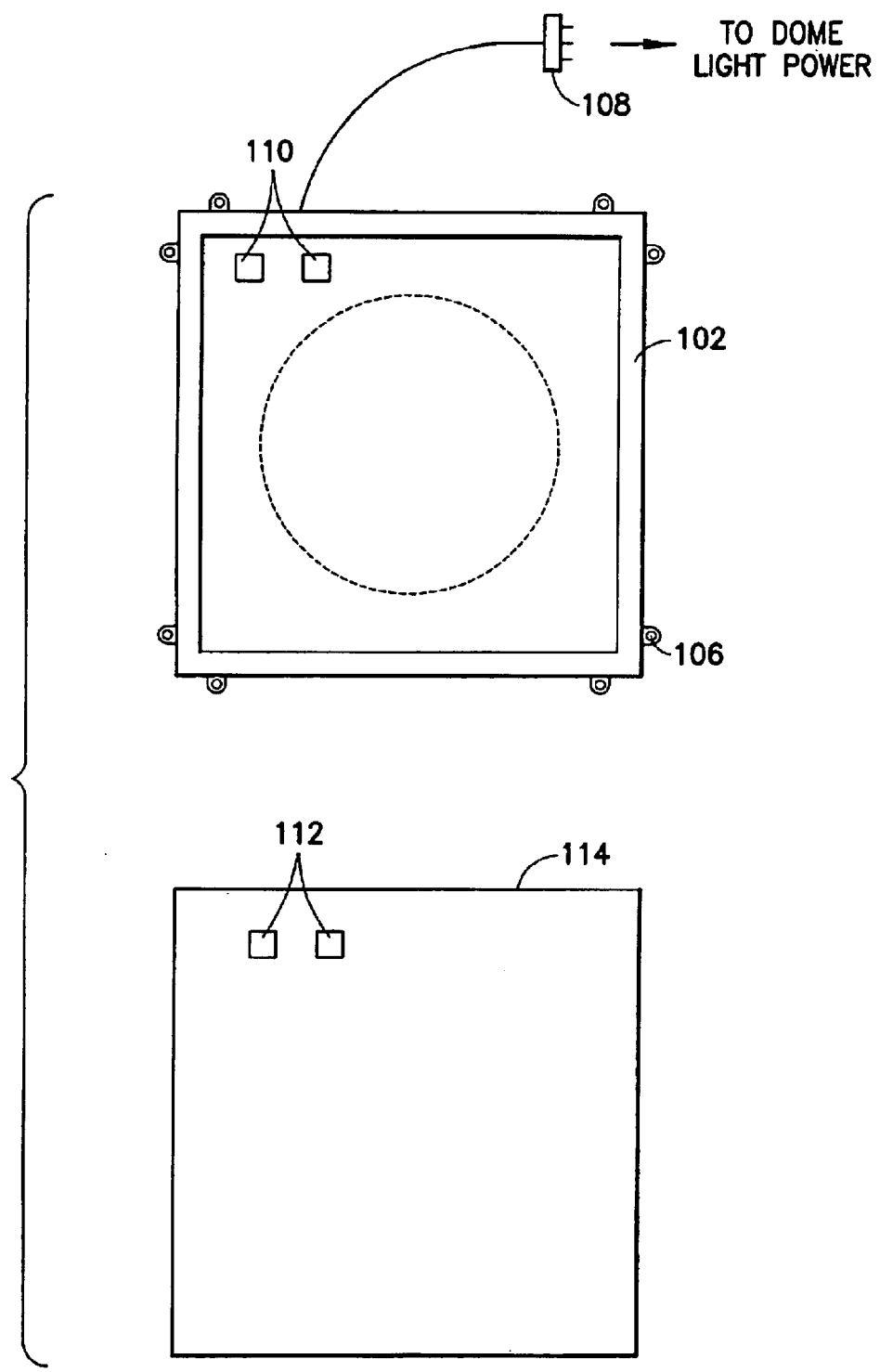
FIG. 9 is a plan view of the system of FIG. 8.

The inventive concept herein of using a sleeve for mounting to the vehicle and thus providing a universal mounting structure that easily provides vehicular power to the housing mounted thereto may be extended to other areas of the vehicle. Thus, in a second major aspect of the invention, the space existing on the interior roof of the vehicle, nearby the area otherwise taken by the typical vehicle dome light, is used in the same manner. As shown in FIGS. 8 and 9, a mounting adapter 102 is thusly configured to attach to the interior roof 104 of the vehicle, such as by self-tapping screws 106 or the like. Alternatively, the vehicle's dome light may be removed, and the remaining structure for the dome light may be used to attach the mounting adapter in manner similar to the dashboard embodiment previously described. Power may be obtained from the power leads otherwise used for the dome light, by connecting a connector 108 to the dome light harness in a manner similarly done for overhead audio/video entertainment systems popular today. The mounting adapter 102 has a pair of electrical power contacts 110 disposed so as to obtain power from the dome light harness and provide power to a mating pair of contacts 112 to be described herein.

A housing 114 is provided, which is adapted to mate with the mounting adapter 102 in a universal fashion. Power contacts 112 are provided on the housing 114 to enable vehicle power to be transferred from the dome light harness to the interior of the housing. The housing 114 may contain any type of device that would be suitably mounted to the interior roof; for example a DVD player, a VCR, a television set, a CD player, an MP3 player, a video camera display, a gaming machine, etc. Connectivity may be provided, as described with respect to the dashboard embodiment, to enable use of exterior speakers, etc. A drop-down visual display 116 is also provided, as shown in FIG. 8. This invention is advantageous over prior art systems since those are dedicated and, once installed, cannot be easily changed. By providing a modular, universal mounting frame 102, connected as described to vehicle power, and type of electrically powered device may be used by simply interchanging housings 114 in accordance with this invention.

Figure 11:
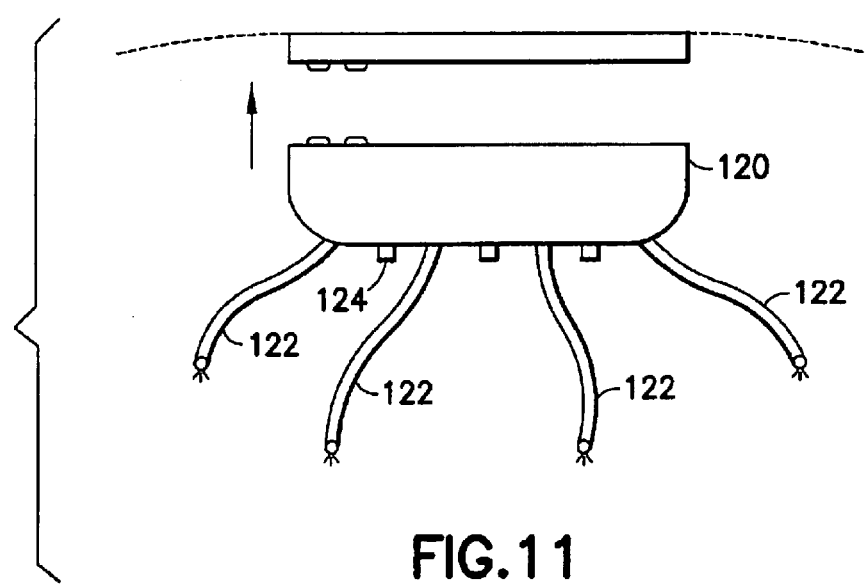
FIG. 11 is an illustration of a lighting embodiment of the invention.

A particularly advantageous device to be used with this aspect of the invention is a lighting device 120 as shown in FIG. 11. A plurality of light-emitting fixtures 122, such as fiber optic devices, are shown emanating from the housing. Each of the lighting fixtures 122 are able to be placed in the position and angle desired by a vehicle passenger, so as to provide direct lighting, for example for reading at night. Typical dome lighting systems usually flood the interior space, or a substantial portion thereof, with light when turned on. This can be especially distracting for the driver, since this type of light is usually reflected off of the interior windows and can cause traffic accidents due to reduced visibility. By using the directed light tube aspect of this invention, any or all of the passengers may utilize direct lighting focused on their particular space or region without flooding the interior with light as in the prior art. The lighting fixtures may be made from a bendable but resilient material, such as cable sheathing and the like (e.g. for Romex cable, etc.), with a pinpoint light source such as a fiber optic cable disposed inside. Individual switches 124 may be used to control each light as desired.

Figure 10:
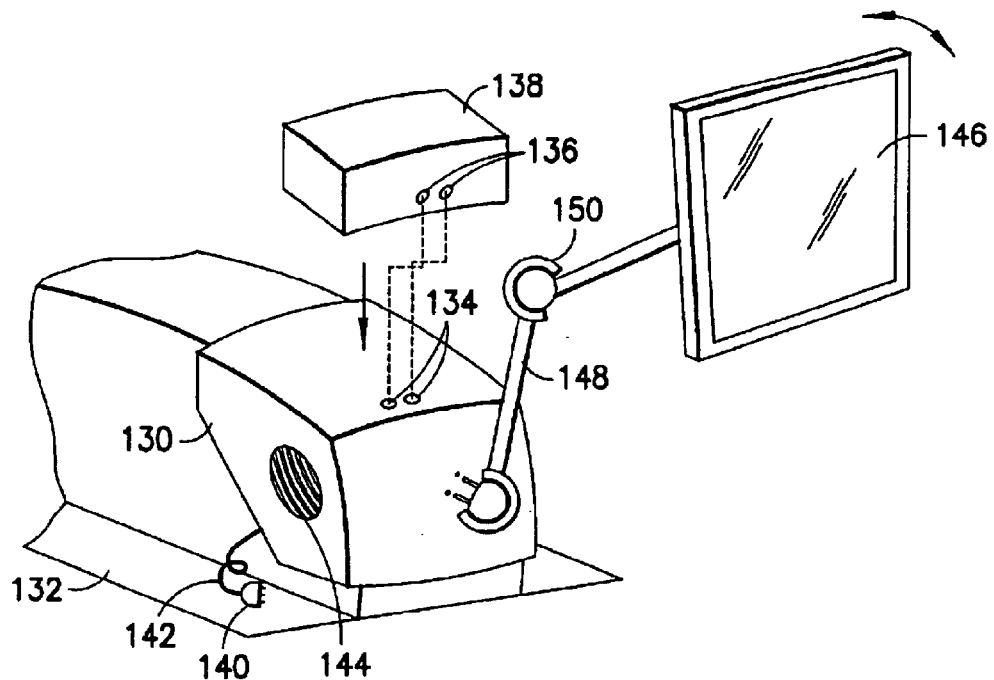
FIG. 10 is a perspective view of the modular console electronics system of the present invention.

In a third major aspect of the invention, the otherwise unused space within or on top of a console, such as the center console located between the front seats of a vehicle, is used in the same manner. With reference to FIG. 10, a frame 130 is provided, which is adapted to engage with a vehicle console 132. The frame 130 may for example be configured to fit within the inside or on top of (as shown in FIG. 10) a center console located between the two front bucket seats of a vehicle. The frame includes a pair of power contacts 134 that are arranged so as to be exposed on the frame 130 (for mating with like contacts 136 on a housing 138). The pair of contacts 134 are wired via wiring means 142 to a power connector 140, which is adapted to plug into a nearby power receptacle such as a cigarette lighter receptacle or a power point.

A housing 138 is provided which is adapted to be mated with the frame 130; the housing 138 includes a second pair of power contacts 136 arranged so as to electrically connect with the power contacts 134 on the frame 130 and provide electrical power from the vehicle's electrical system to an electronic device within the housing. As with the dashboard and interior roof embodiments discussed above, virtually any type of electronic or electrical device may be encased by the housing 138, either entirely within, with multiple pieces, etc. Of particular use with this embodiment is an entertainment system such as a gaming machine, a DVD player or VCR, a television set, etc. Speakers 144 may be attached to the frame, with contacts arranged so that audio signals may be sent from the electronic device in the housing to the frame-mounted speakers. Likewise, a video display device 146 may be attached to the frame, with video signals being sent from the internal device to the display via a set of contacts or a connector between the frame and the housing. The video display device may be mounted in a manner similar to the dashboard embodiment; i.e. with an articulating arm 148 and a ball and socket mechanism 150 or the like to allow the display to be moved, pivoted, rotated, etc. as desired by the vehicle passengers. The display may be directed towards the rear, or it may telescope to the front seats and be used by a front seat passengers as well.

In addition to wired or tethered accessories, such as controllers used with gaming consoles or headphones with audio/video systems, the present invention may utilize wireless connections to peripheral devices as known in the art. Wireless technologies including but not limited to infrared, RF such as the IEEE 802.11 standard, Bluetooth technologies, and the like, may be used to allow a device peripheral to be used in an untethered manner. A particularly useful embodiment includes a surveillance system with wireless cameras, microphones, camcorders, and other imaging (video and audio) devices that can capture and/or stream data such as images and sounds and feed such data wirelessly to a base unit located within the housing. For example, a surveillance system could have a tape recorder (digital or analog) embedded in the housing, with a wireless link to a microphone used outside the vehicle for capturing sounds such as a conversation and recording those sounds for future use. Likewise, digital images could be captured and forwarded to a base unit in the vehicle for storage and later analysis. A video camera could be mounted external to the vehicle, and images sent wirelessly to the housing in the vehicle as the vehicle is moving or stationary.

Another embodiment implements an alarm system within the housing. In vehicles that have no alarm system installed (which can be expensive and time-consuming) a self-contained alarm system including such devices as a motion sensor and siren (or even a theft-disabling device such as a tear gas canister) could be installed under this invention. In the event that a device such as a tear gas canister is exhausted (e.g. after use), it could be easily replaced by simply inserting another housing into the sleeve.

Thus, while particular embodiments of the present invention have been shown and described, various modifications will be apparent to those skilled in the art, and therefore it is not intended that the invention be limited to the disclosed embodiment or to details thereof and departures may be made therefrom within the spirit and scope of the present invention.

I claim:

1. A modular system for vehicle dashboards comprising:
   a. a sleeve adapted to slide into and engage with an opening in the dashboard of a vehicle; the sleeve comprising:
      i. an inner surface area;
      ii. a first pair of power contacts arranged so as to be exposed on the inner surface area;
      iii. a power connector adapted to plug into a power supply receptacle fixedly mounted on an exterior portion of the vehicle dashboard;
      iv. wiring means for connecting the power connector to the first pair of power contacts; whereby, when the power connector is plugged into a power supply receptacle fixedly mounted on an exterior portion of a vehicle dashboard, electrical power from the vehicle is supplied to the pair of power contacts; and
   b. a housing adapted to be inserted into the sleeve and slidingly engage with the inner surface area of the sleeve, the housing comprising an electrically powered device and a second pair of power contacts arranged so as to electrically connect with the first pair of power contacts when the housing is engaged with the sleeve and to provide electrical power from the vehicle to the electrically powered device.

2. The system of claim 1 wherein the sleeve further comprises a first plurality of speaker contacts arranged so as to be exposed on the inner surface area, wherein the first plurality of speaker contacts are wired to speakers mounted external to the housing.

3. The system of claim 1 wherein the sleeve further comprises a first plurality of microphone contacts arranged so as to be exposed on the inner surface area, and wherein the first plurality of microphone contacts are wired to a microphone mounted external to the housing.

4. The system of claim 1 wherein the sleeve further comprises a first antenna contact arranged so as to be exposed on the inner surface area, and wherein the antenna contact is wired to an antenna mounted external to the housing.

5. The system of claim 1 wherein the sleeve further comprises a pair of guide rails on an outer surface adapted to slidingly engage with a pair of mating tracks on the vehicle dashboard.

6. The system of claim 1 wherein the housing is adapted to fit substantially within the opening of the dashboard.

7. The system of claim 1 wherein the power connector is adapted to plug into a cigarette lighter receptacle fixedly mounted on an exterior portion of a vehicle dashboard.

8. The system of claim 1 wherein the wiring means for connecting the power connector to the first pair of power contacts comprises a wiring harness connected to the power connector at a first end and coupled to the first pair of power contacts via a pair of wires at a second end located external to the sleeve when the sleeve is slid into and engaged with an opening in the dashboard of a vehicle.

9. The system of claim 1 wherein the electrically powered device comprises a cellular telephone unit.

10. The system of claim 9 wherein the cellular telephone unit comprises:
    a cellular telephone transceiver,
    a power supply that receives power from the second pair or power contacts,
    input means for providing audio input to the telephone transceiver,
    output means for providing audio output from the telephone transceiver,
    antenna means for transmitting and receiving radio frequency signals; and
    a keypad panel located on a front face of the housing for controlling operation of the cellular telephone transceiver.

11. The system of claim 10 wherein
    the sleeve further comprises a first plurality of speaker contacts arranged so as to be exposed on the inner surface area,
    the first plurality of speaker contacts are wired to speakers mounted external to the housing, and
    the output means comprises a second plurality of speaker contacts arranged so as to electrically connect with the first plurality of speaker contacts when the housing is engaged with the sleeve and to provide audio output from the cellular telephone transceiver to the speakers mounted within the vehicle.

12. The system of claim 10 wherein the output means comprises a speaker mounted within the housing.

13. The system of claim 10 wherein
    the sleeve further comprises a first plurality of microphone contacts arranged so as to be exposed on the inner surface area,
    the first plurality of microphone contacts are wired to a microphone mounted external to the housing, and
    the input means comprises a second plurality of microphone contacts arranged so as to electrically connect with the first plurality of microphone contacts when the housing is engaged with the sleeve and to provide audio input to the cellular telephone transceiver from the microphone mounted within the vehicle.

14. The system of claim 10 wherein the input means is a microphone mounted on the housing.

15. The system of claim 10 wherein
    the sleeve further comprises a first antenna contact arranged so as to be exposed on the inner surface area,
    the antenna contact is wired to an antenna mounted external to the housing, and
    the antenna means comprises a second antenna contact arranged so as to electrically connect with the first antenna contact when the housing is engaged with the sleeve and to provide radio frequency signals to and from the cellular telephone transceiver.

16. The system of claim 10 wherein the antenna means is an antenna mounted on the housing.

17. The system of claim 9 wherein the cellular telephone unit is a docking station comprising
    reception means for receiving a handheld cellular telephone, a docking station connector for engaging with a mating cell phone connector on the handheld cellular telephone, means for connecting the second pair of power contacts to the docking station connector for providing electrical power from the vehicle to the handheld cellular telephone, input means, coupled to the docking station connector, for providing audio input to the handheld cellular telephone, output means, coupled to the docking station connector, for providing audio output from the handheld cellular telephone, and antenna means for transmitting and receiving radio frequency signals.

18. The system of claim 17 wherein the sleeve further comprises a first plurality of speaker contacts arranged so as to be exposed on the inner surface area, the first plurality of speaker contacts are wired to speakers mounted external to the housing, and the output means comprises a second plurality of speaker contacts arranged so as to electrically connect with the first plurality of speaker contacts when the housing is engaged with the sleeve and to provide audio output from the handheld cellular telephone to the speakers mounted within the vehicle.

19. The system of claim 17 wherein the output means comprises a speaker mounted within the housing.

20. The system of claim 17 wherein the sleeve further comprises a first plurality of microphone contacts arranged so as to be exposed on the inner surface area, the first plurality of microphone contacts are wired to a microphone mounted external to the housing, and the input means comprises a second plurality of microphone contacts arranged so as to electrically connect with the first plurality of microphone contacts when the housing is engaged with the sleeve and to provide audio input to the handheld cellular telephone from the microphone mounted within the vehicle.

21. The system of claim 17 wherein the input means is a microphone mounted on the housing.

22. The system of claim 17 wherein the sleeve further comprises a first antenna contact arranged so as to be exposed on the inner surface area, the antenna contact is wired to an antenna mounted external to the housing, and the antenna means comprises a second antenna contact arranged so as to electrically connect with the first antenna contact when the housing is engaged with the sleeve and to provide radio frequency signals to and from the handheld cellular telephone.

23. The system of claim 17 wherein the antenna means is an antenna mounted on the housing.

24. The system of claim 1 wherein the electrically powered device comprises an entertainment device comprising a. processing means for processing an input signal and providing an audio signal;

b. output means, connected to the processing means, for using the audio signal to generate sound waves;

c. control means for allowing a user to control operation of the entertainment device; and d. means for providing electrical power from the second pair of power contacts.

25. The system of claim 24 wherein the sleeve further comprises a first plurality of speaker contacts arranged so as to be exposed on the inner surface area, the first plurality of speaker contacts are wired to speakers mounted external to the housing, and the output means comprises a second plurality of speaker contacts arranged so as to electrically connect with the first plurality of speaker contacts when the housing is engaged with the sleeve and to provide audio signals from the entertainment device to the speakers mounted within the vehicle.

26. The system of claim 24 wherein the output means comprises a speaker mounted within the housing.

27. The system of claim 24 wherein the audio data is encoded with data in the MP3 format.

28. The system of claim 24 wherein the audio data is encoded with data in the WMP format.

29. The system of claim 24 further comprising a data connector adapted to be connected to a computer unit when the electrically powered device is removed from the sleeve, and data storage means for storing audio data downloaded from the computer unit via the data connector.

30. The system of claim 24 further comprising display means for presenting a video display.

31. The system of claim 24 wherein the entertainment device further comprises a media drive for playing media encoded with audio data, wherein the input signal provided to the processing means comprises audio data obtained from the media drive.

32. The system of claim 31 wherein the media drive is a compact disc drive unit.

33. The system of claim 31 wherein the media drive is a flash memory unit.

34. The system of claim 1 wherein the housing comprises an articulating arm attached to the housing with a ball and socket mechanism, and a device mounting plate suitable for attaching an external electrically powered device.

35. The system of claim 34 wherein a tablet computer is attached to the device mounting plate.

* * * * *